(12) United States Patent
Helot et al.

(10) Patent No.: US 11,623,524 B2
(45) Date of Patent: Apr. 11, 2023

(54) DISPLAY DEVICE WITH A TRANSPARENT PIXEL MATRIX FOR DISPLAYING SELECTABLE GRAPHIC OBJECTS AND MOTOR VEHICLE AND OPERATING METHOD FOR THE DISPLAY DEVICE

(71) Applicant: AUDI AG, Ingolstadt (DE)

(72) Inventors: Jacques Helot, Ingolstadt (DE); Ulrich Mueller, Ingolstadt (DE); Carolin Koeberle, Ingolstadt (DE); Jens Granitza, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/605,855

(22) PCT Filed: Oct. 22, 2020

(86) PCT No.: PCT/EP2020/079694
§ 371 (c)(1),
(2) Date: Oct. 22, 2021

(87) PCT Pub. No.: WO2021/083775
PCT Pub. Date: Mar. 6, 2021

(65) Prior Publication Data
US 2022/0219539 A1 Jul. 14, 2022

(30) Foreign Application Priority Data

Oct. 28, 2019 (DE) .............................. 102019129027
Oct. 6, 2020 (DE) .............................. 102020126083

(51) Int. Cl.
*B60K 37/02* (2006.01)

(52) U.S. Cl.
CPC ........ *B60K 37/02* (2013.01); *B60K 2370/151* (2019.05); *B60K 2370/152* (2019.05); *B60K 2370/27* (2019.05); *B60K 2370/52* (2019.05)

(58) Field of Classification Search
CPC .......... B60K 2370/152; B60K 2370/27; B60K 2370/52; B60K 2370/151
See application file for complete search history.

(56) References Cited

U.S. PATENT DOCUMENTS 11,104,229 B2 * 8/2021 Galan Garcia ........ B60Q 3/745
2013/0293364 A1 * 11/2013 Ricci .................. G02B 27/0101
340/425.5

(Continued)

FOREIGN PATENT DOCUMENTS

DE 103 40 028 A1 4/2005
DE 10 2010 010 575 A1 9/2011

(Continued)

OTHER PUBLICATIONS

German Examination Report dated Jul. 29, 2020, in German Patent Application No. 10 2019 129 027.9 (8 pages).

(Continued)

*Primary Examiner* — Christopher E Leiby
(74) *Attorney, Agent, or Firm* — Staas & Halsey LLP (57) ABSTRACT

A transparent pixel matrix, a screening layer, and a control circuit are included in a display apparatus. The control circuit displays a graphic object on the pixel matrix. The screening layer includes individually switchable segments arranged behind the pixel matrix and the segments are switchable with respect to their transparency between a minimum value and a maximum value. The control circuit selects the graphic object based on an input by the user. The control circuit signals the graphic object is selected by operating a first segment among the segments arranged behind the selected graphic object as a selection segment, with the minimum value of transparency or with the maximum value of transparency, and by operating a second segment among the segments as a background segment in a complementary fashion with respect to the selection seg- (Continued)

ment, with the maximum value of transparency or the minimum value of transparency.

20 Claims, 3 Drawing Sheets

(56) References Cited

U.S. PATENT DOCUMENTS

| | | | |
|---|---|---|---|
| 2014/0185129 A1* | 7/2014 | Kim | G02F 1/1677 |
| | | | 359/296 |
| 2018/0012562 A1* | 1/2018 | Mertens | G09G 5/10 |
| 2018/0174555 A1* | 6/2018 | Lee | G09G 5/003 |
| 2018/0188531 A1* | 7/2018 | Dubey | H01L 27/3267 |
| 2018/0370440 A1* | 12/2018 | Larson | B60R 1/12 |
| 2019/0331959 A1* | 10/2019 | Weindorf | G02F 1/133512 |
| 2020/0257115 A1* | 8/2020 | Pasca | G02B 27/01 |
| 2020/0369223 A1* | 11/2020 | Hansen | G06F 3/0412 |
| 2022/0068199 A1* | 3/2022 | Helot | G06T 7/20 |

FOREIGN PATENT DOCUMENTS

| | | |
|---|---|---|
| DE | 10 2010 055 144 A1 | 6/2012 |
| DE | 10 2014 108 656 A1 | 1/2015 |
| DE | 10 2017 212 912 A1 | 1/2019 |
| DE | 10 2018 220 686 A1 | 6/2020 |

OTHER PUBLICATIONS

International Search Report dated Feb. 2, 2021, in International Application No. PCT/EP2020/079694 (21 pages including WIPO translation of Form PCT/ISA/210 and machine translation of Form PCT/ISA/237).

German Examination Report dated Apr. 23, 2021, in German Patent Application No. 10 2020 126 083.0 (2 pages).

International Preliminary Report on Patentability (Form PCT/IB/373); dated May 3, 2022 in corresponding PCT Application No. PCT/EP2020/079694 (1 page).

Notification of Transmittal of Translation of International Preliminary Report on Patentability (Form PCT/IB/373); dated May 12, 2022 in corresponding PCT Application No. PCT/EP2020/079694 (1 page).

\* cited by examiner

DISPLAY DEVICE WITH A TRANSPARENT PIXEL MATRIX FOR DISPLAYING SELECTABLE GRAPHIC OBJECTS AND MOTOR VEHICLE AND OPERATING METHOD FOR THE DISPLAY DEVICE

CROSS REFERENCE TO RELATED APPLICATIONS

This application is a U.S. national stage of International Application No. PCT/EP2020/079694, filed on Oct. 22, 2020. The International Application claims the priority benefit of German Patent Application No. 10 2019 129 027.9 filed on Oct. 28, 2019, and of German Patent Application No. 10 2020 126 083.0 filed on Oct. 6, 2020. The disclosures of each of International Application No. PCT/EP2020/079694, German Patent Application No. 10 2019 129 027.9, and German Patent Application No. 10 2020 126 083.0, are incorporated by reference herein in their entirety.

BACKGROUND

Described herein is a display apparatus having a pixel matrix that a user can view from a predetermined main viewing point (for example in a motor vehicle from the driver's seat). The pixel matrix is transparent, and at least one graphic object, such as for example a symbol or a menu element, which the user can select by use of a user input, can be presented or displayed on it by way of a control circuit. A motor vehicle having such a display apparatus and a method for operating the display apparatus are also described herein.

A transparent pixel matrix is known from German Patent Application No. 10 2014 108 656 A1, which describes that such a pixel matrix may be based on TOLED (transparent organic light emitting diode) technology or a transparent LCD display (liquid crystal display). The recognizability of graphic objects arranged on such a transparent pixel matrix depends on the lighting intensity of the background that can be seen through the transparent pixel matrix.

With respect to a non-transparent pixel matrix, German Patent Application No. 10 2010 010 575 A1 describes that a transparent layer can be arranged (viewed from the main viewing point of the user) in front of the pixel matrix, and an opaque lacquer can be arranged on the transparent layer so as to cover parts of the pixel matrix. However, the result is a permanent covering.

German Patent Application No. 10 2010 055 144 A1 describes that a switchable screening layer that can be switched between a transparent and an opaque state can be arranged in front of a non-transparent pixel matrix. In this case, the switchable screening layer can be divided into a plurality of segments, with the result that, viewed from the main viewing point of the user, parts of the pixel matrix can be switched between covered and visible states in alternation. This does not bring about an improvement of the display contrast for a transparent pixel matrix against a brightly lit background.

SUMMARY

Described herein is a display apparatus having a transparent pixel matrix, by use of which a user's attention can be drawn to a graphic object that is presented on the pixel matrix even if a bright and/or multicolored background is visible through the transparent pixel matrix.

This may be achieved by the display apparatus described herein. Advantageous embodiments of the display apparatus are also described herein.

A display apparatus having a pixel matrix is described herein. The display apparatus proceeds from the fact that the pixel matrix can be viewed or seen by a user from a main viewing point along a predetermined main viewing direction. The user can thus look at the pixel matrix from a main viewing point, resulting in the described main viewing direction toward the pixel matrix. Such a main viewing point can be the head position intended for the use of the display apparatus. The main viewing direction can be aligned for example perpendicular to a surface of the pixel matrix. It is for example the vector that is pointed from the main viewing point (head position) to the pixel matrix.

The pixel matrix is transparent. It can be based for example on the described TOLED technology or on what are known as transparent micro LEDs (light-emitting diodes). A user can thus look at the pixel matrix along the main viewing direction and will then see, behind the pixel matrix, the background arranged there. If the display apparatus is arranged for example in a motor vehicle in front of a windowpane thereof, the user can view the environment of the motor vehicle through the pixel matrix and the windowpane. The pixel matrix can also be arranged in front of a trim part, for example a wood veneer in a manner such that the wood grain is visible as the background.

A control circuit of the display apparatus is configured to display at least one graphic object, that is to say for example at least one icon, by use of the pixel matrix. For this purpose, the pixel matrix can have self-luminous pixels that can be actuated or activated by the control circuit. A graphic object can be described for example by pixel data indicating in each case the light color and/or light brightness for individual pixels of the object. A user can then see or view the at least one displayed graphic object on the pixel matrix by looking from the main viewing point along the main viewing direction. Since the pixel matrix is transparent, light from a region behind the pixel matrix can also travel through the latter to the eye of the user.

As seen from the main viewing point along the main viewing direction, a screening layer with individually switchable segments is therefore arranged behind the pixel matrix. The user can thus look from the main viewing point through the pixel matrix and see therebehind the screening layer. The segments of the screening layer are designed to be switchable in each case with respect to their transparency between a minimum value (minimum transparency, maximum opacity), a maximum value (maximum transparency, minimum opacity), and at least one intermediate value (between minimum value and maximum value). A switchable segment can be implemented for example on the basis of an SPD (suspended particle device) and/or a PDLC (polymer dispersed liquid crystal) and/or an electrochromic layer and/or by use of micro-lamellae. The minimum value can lie for example in a range from 0 percent to 10 percent transparency (100 percent to 90 percent opacity), and the maximum value can lie in a range from 50 percent to 100 percent transparency (50 percent to 0 percent opacity). The respective value can be technology-related. A possible intermediate value can be set by setting a frequency of an alternating voltage and/or an amplitude/an absolute value of an electric voltage.

The control circuit is configured to select a displayed graphic object depending on a user input by the user. The user can thus make a selection by use of their user input, by use of which selection a displayed graphic object will be determined as currently being selected. The at least one graphic object can be, for example, a constituent part of an operating menu, and the selected object can be a menu element that is to be activated or executed when the user signals for example a confirmation of the selection.

Since the at least one graphic object is displayed on a transparent pixel matrix, it is now necessary to visualize or signal to the user, against the background that is visible through the pixel matrix, which graphic object is currently selected. It is frequently difficult in this case to simply present selected graphic objects more brightly than any other graphic object because each graphic object is already displayed with maximum brightness so as to optically or visually distinguish it from the background with respect to the presentation contrast. It is possible to display a frame around the currently selected object.

The switchable segments can further support the display of the selection. For signaling which object is currently selected, the control circuit is therefore configured to operate for this purpose, viewed along the main viewing direction, at least each segment of the screening layer arranged behind the selected object as the respective selection segment with the minimum value or the maximum value of the transparency and to operate at least one of the segments as a background segment in a complementary fashion with the maximum value or the minimum value of the transparency. Only each segment that is located behind the selected object can be switched in this manner or, for example, additionally a frame region around the selected object in order to further enhance the contrast. At least one selection segment is thus arranged to coincide with the selected object and is switched to opaque. Consequently, light from the background behind the currently selected object is screened off or blocked by the at least one selection segment, while the background through the at least one background segment continues to be visible. Alternatively, behind the currently selected object, each segment of the screening layer located there can be switched to transparent and at least one of the remaining segments can be switched to opaque.

From the view of the user, that segment or (in the case of small segments) a plurality of segments that are all located behind the selected object are switched to minimally transparent/maximally opaque. The influence of the background illumination is thus minimized. At least one surrounding segment, however, continues to be operated as background segment with maximum transparency or minimum opacity. The view through the pixel matrix is thus only minimally restricted. Complementary switching of the segments can also be provided.

Consequently, the user advantageously sees which object can be selected next.

Also part of the disclosure includes developments that offer additional advantages.

It has been found that the area of the graphic object is generally small in a manner such that by switching each segment behind the selected object to opaque, only a very small viewing angle of the user is switched to opaque (possibly less than 1 degree of viewing angle), and therefore the selected graphic object with the selection segment (or the plurality of selection segments) that is/are located therebehind and has/have been switched to opaque can still be overlooked. To avoid this, the display apparatus makes provision for at least one segment to be provided as an intermediate segment, operated in each case with an intermediate value of the transparency, between the at least one selection segment (switched to opaque) and the at least one background segment (switched to maximally transparent), that is to say the selected object is flanked or framed, on at least one side or on several sides or on all sides, by a partially transparent intermediate segment. In other words, at least one intermediate segment, being arranged as a frame or a buffer between the selection segment (selected object) and the at least one background segment (through which the background is detectable), is provided around the at least one selection segment behind the selected object. Each intermediate segment here has an intermediate value with respect to the transparency between the minimum value and the maximum value.

Consequently, in the case of an arrangement of the objects in one row, this is the following row arrangement of the segments: at least one background segment, at least one intermediate segment, at least one selection segment (behind the selected object), at least one intermediate segment, at least one background segment. The result is a local masking or showing of the selected object through the at least one partially transparent intermediate segment, which is visible through the transparent pixel matrix to the right of and/or to the left of and/or above and/or below the selected object.

This offers the advantage that a merely partially transparent screening layer is provided around the selected object by setting at least one intermediate segment with an intermediate value of the transparency. Moreover, each further remaining segment of the screening layer continues to be operated as a background segment with the maximum value of the transparency. Consequently, the user's gaze is directed onto a larger field or onto a larger region of the reduced transparency without thereby creating any ambiguity as to which object is the selected object. This is because only the selection segments or the individual selection segment behind the actually selected object has the minimum value of the transparency. In other words, the screening layer is switched to completely opaque only behind the actual screening layer.

The user input for selecting a displayed object can be captured for example as a gesture and/or based on a viewing direction of the user and/or using a rotary adjuster and/or a key and/or on the display area of the display apparatus. The latter is possible if the display apparatus is designed as a touch screen. The respectively currently selected object is then presented with maximum contrast behind the selected object due to the selection element that has been switched to opaque (minimum transparency) or the plurality of selection segments that have been switched to opaque because the portion of background light in the region of the selected object is minimized. The selected graphic object is framed or flanked by at least one intermediate segment having the respective intermediate value of the transparency. The rest of the pixel matrix is presented through the background segments with maximum transparency.

The graphic objects that can be presented in each case in the manner described are a menu element of a selection menu and/or an icon and/or a graphic representation of media data (for example MP3 or data stream for video and/or audio). Once an object is selected and the user wishes to activate the selected object, the control circuit can, for example, activate the selected object for example using a signal word (voice recognition) and/or by use of a touch screen (the pixel matrix then additionally has a touch film) and/or using gesture recognition (for example camera-based) and/or using key activation.

In an embodiment, the minimum value, the at least one intermediate value, and the maximum value of the transparency correspond to an increasing transparency. Starting from the at least one selection segment arranged behind the selected object (minimum value), the transparency of the segments increases in at least two steps. In other words, starting from the selected object, masking in at least two steps takes place by use of the segments of the screening layer, wherein the masking is effected by setting the transparency. For example, three steps (e.g. 0%, 20%, 40%, and maximum transparency) or more than three steps are provided. This offers the advantage that the gradient of the transparency of the screening layer (that is to say the direction vector of the transparency change) signals the location of the selected object on the pixel matrix. There is therefore no need for any additional graphic object, for example an arrow, to be presented on the pixel matrix itself. This saves time and effort when setting up the GUI (graphical user interface).

In an embodiment, the control circuit is configured to operate a plurality of intermediate segments having different transparency values. This results in the more than two steps in the transition from the selection segment behind the selected object and the background segments. As a result, a transition of the soft-fade effect is smoother.

In an embodiment, the control circuit is configured to operate each of the segments as a background segment, that is to say to operate the entire screening layer at maximum transparency, if there is no selected graphic object. If no selection is currently taking place, the screening layer of the display apparatus offers the lowest optical influence or the lowest optical impediment for the user. Consequently, the user can view the background through the pixel matrix and the screening layer.

In an embodiment, the control circuit is configured to display a plurality of graphic objects, and the user can thus change between the objects during the user input such that the selected object changes during the user input. The control circuit is then configured to display the objects in a spatially fixed manner on the pixel matrix when the selected object is changed, that is to say to nevertheless keep each object in its place when the selected object is changed and instead to set the transparency of the segments of the screening layer depending on a current position of the currently selected object. In other words, if the selection of one of the objects changes to another one of the objects, the at least one segment behind the old, previously selected object is switched away from the minimum value of the transparency (the transparency is increased) and the at least one segment behind the newly selected object is operated as the selection segment (minimum transparency). Accordingly, the remaining segments are also operated as an intermediate segment or a background segment in accordance with their locations relative to the currently selected object. This offers the advantage that the positions of the objects on the pixel matrix do not need to change if the selection is changed, which obviates the need for a new visual search by the user.

In an embodiment, the control circuit is configured to display a plurality of graphic objects and to change the selected object during the user input and in the process to operate, by contrast, the at least one selection segment, the at least one intermediate segment, and the at least one background segment in a spatially unchanged manner and instead to display on the pixel matrix the respectively currently selected object in front of the at least one selection segment. By changing the selection, the position of the objects is thus changed, with the result that the currently selected object is displayed or presented in front of the at least one selection segment. To this end, the objects can be displaced in an animated manner when the selection changes. This offers the advantage that the at least one selection segment with the selected object that is visible in front of it can always be displayed for example at the same location or in the same region, for example at the center of the pixel matrix.

In an embodiment, a respective surface area of the segments corresponds in each case to an overall surface area of an individual pixel or of a plurality of pixels of the pixel matrix, and for example only one segment per object is provided. In other words, each segment of the screening layer is larger than one pixel of the pixel matrix. Consequently, the transparency for a plurality of pixels can be set at once by switching one individual segment. If a separate, assigned segment is provided per pixel, the screening of the screening layer can be adapted with pixel accuracy to the shape of the object.

In an embodiment, the segments are monochrome at a respective point in time. In other words, each segment offers a monochrome background that is simple in terms of color for the pixels of the pixel matrix that are arranged in front of it. This ensures the recognizability of the graphic objects through the segments.

The display apparatus has proven useful for example when used in a motor vehicle. Accordingly, described herein is a motor vehicle having an embodiment of the display apparatus described herein, wherein a free space is provided behind the display apparatus along a main viewing direction resulting due to the display apparatus, along which a user in the motor vehicle can view the display apparatus. If the screening layer is switched to transparent, the user can thus see the free space (e.g., an external environment) through the transparent pixel matrix. So, despite a display apparatus being provided in the motor vehicle, the sense of space is not restricted when the pixel matrix and the screening layer are switched to transparent.

The motor vehicle described herein is for example embodied in the form of a motorized vehicle, for example a passenger car or truck, or as a minibus or motorcycle.

Also described herein is a method for operating the display apparatus, wherein a control circuit displays at least one graphic object in the manner described by use of a transparent pixel matrix and a screening layer with individually switchable segments behind the pixel matrix viewed along the main viewing direction is operated. The control circuit can for this purpose be implemented or provided on the basis of at least one microprocessor and/or at least one microcontroller. The pixel matrix can be actuated using the control circuit in order to actuate or set the respective light brightness and/or light color of individual pixels of the pixel matrix, for example depending on pixel data or graphics data of the at least one object. The screening layer can be implemented in the manner described from segments based on one of the technologies. The segments are designed here such that they are switchable with respect to their transparency between a minimum value, a maximum value, and at least one intermediate value. In other words, at least 3 degrees of the transparency and thus also at least 3 degrees of the opacity can be set. This is possible with the technologies described herein. The control circuit selects, depending on a user input by a user, a displayed graphic object and signals this selection to the user by, viewed along the main viewing direction, each segment arranged behind the selected object being operated as a respective selection segment with the minimum value of the transparency and at least one of the segments is operated as background segment with the maximum value of the transparency, and, for a stepped transition of the transparency, at least one segment of the screening layer arranged between the at least one selection segment and the at least one background segment being operated as an intermediate segment in each case with at least one of the at least one intermediate values.

Developments and other aspects of the method also include the developments and other aspects of the display apparatus described herein. For this reason, the corresponding developments and other aspects of the method will not be described again.

The disclosure also includes the combinations of the features of the described embodiments.

BRIEF DESCRIPTION OF THE DRAWINGS

These and other aspects and advantages will become more apparent and more readily appreciated from the following description of the example embodiments, taken in conjunction with the accompanying drawings of which:

FIG. 5 is a schematic illustration of a display content of the display apparatus in an embodiment in which intermediate values for the transparency are dispensed with.

DETAILED DESCRIPTION

Reference will now be made in detail to example embodiments, examples of which are illustrated in the accompanying drawings.

The embodiments discussed below are example embodiments. In the example embodiments, the described components of the embodiments each represent individual features that should be considered independently of one another and also develop the disclosure in each case independently of one another. The disclosure is therefore also intended to include combinations of the features of the embodiments other than those illustrated. Furthermore, the described embodiments may also be supplemented by further features that have already been described.

In the drawings, identical reference signs each denote elements of identical function.

Figure 1:
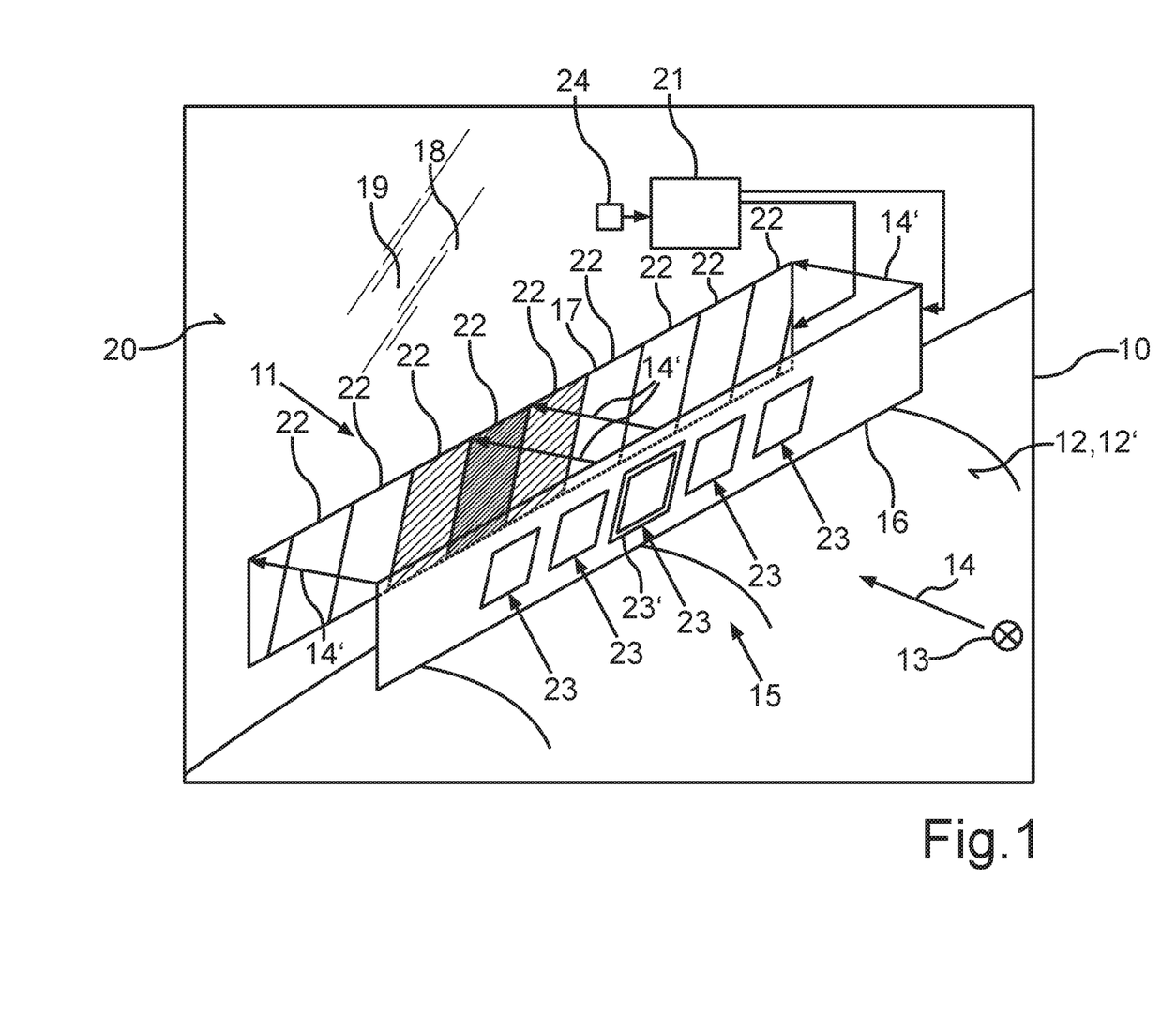
FIG. 1 is a schematic illustration of an embodiment of the motor vehicle described herein with an exploded drawing of a display apparatus.

FIG. 1 shows a motor vehicle 10, which may be a motorized vehicle, for example a passenger car or truck. A display apparatus 11, which can be arranged for example on a dashboard 12, can be provided in the motor vehicle 10. A user (not illustrated) can see along a main viewing direction 14 from a main viewing point 13 onto the display apparatus 11. The main viewing point 13 can be arranged for example on a headrest of a vehicle seat, for example the driver seat. The user can look along the main viewing direction 14 onto the display apparatus 11 and see a display content 15 presented there. The display content 15 can be generated by use of a pixel matrix 16 and also by use of a screening layer 17. The distance shown between the pixel matrix 16 and the screening layer 17 is present only due to the illustration in the form of an exploded drawing; the pixel matrix 16 and the screening layer 17 can touch one another, for example be stuck together. The display apparatus 11 can be arranged in a freestanding manner on the dashboard 12, with the result that a free space 18 is formed behind the display apparatus 11. It is illustrated how an environment 19, which can be seen through a windowpane 20, for example the windshield, can be provided as the free space 18 behind the display apparatus 11, as viewed from the main viewing direction 14.

The pixel matrix 16 can be implemented in the form of a transparent pixel matrix, for example based on TOLED technology. The pixel matrix 16 can be controlled by a control circuit 21 of the display apparatus 11. The screening layer 17 can have individual switchable segments 22, which can be switched in each case with respect to their transparency using the control circuit 21.

In order to illustrate the spatial relative arrangement of the main viewing point 13, the pixel matrix 16, and the screening layer 17, the vector of the main viewing direction 14 is illustrated once again repeatedly as main viewing vectors 14', which in this case are vectors arranged parallel to the main viewing direction 14.

In this way it is possible to see that the individual segments 22 of the screening layer 17 are arranged, viewed along the main viewing direction 14, behind the pixel matrix 16.

The control circuit 21 can display on the pixel matrix 16 graphic objects 23, for example individual menu elements of a selection menu or graphic symbols for individual media contents, for example individual songs.

The user can select between the objects 23. For this purpose, for example, gesture control and/or a rotary adjuster and/or at least one selection key can be provided in a known manner, to mention only examples of possible user inputs 24 for selecting one of the objects 23.

The control circuit 21 can determine one of the objects 23 as selected in dependence on the user inputs 24. In order to visualize for the user the selection of the currently selected object 23', the control circuit 21 can set the transparency or opacity of the segments 22 depending on the currently selected object 23'.

Figure 2:
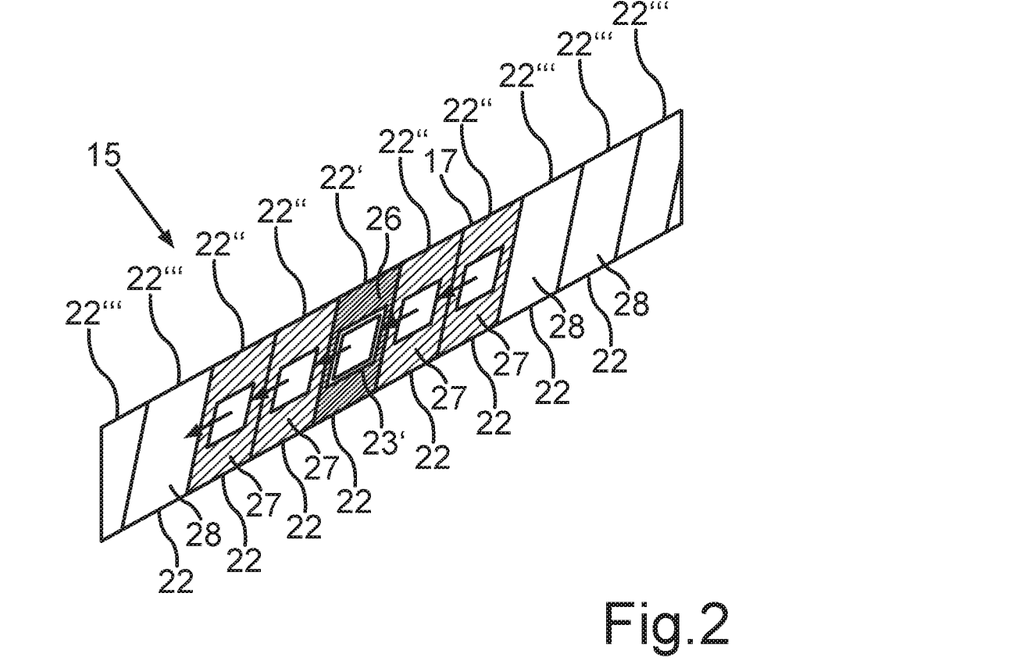
FIG. 2 is a display content of a display apparatus of the motor vehicle during a change of a selection of a graphic object, wherein the graphic object is displaced in the process.

For this purpose, FIG. 2 shows the change of the display content 15, as it can occur for the display apparatus 11 in a first example of the operating method performed by the control circuit 21. The segment 22 located behind the selected object 23' can be operated as a selection segment 22' with the lowest transparency, that is to say with a minimum value 26 of the transparency. Neighboring segments 22" can be operated as intermediate segments with a respective intermediate value 27 for the transparency. Possible intermediate values can be, for example: 80 percent transparency, 60 percent transparency. The remaining segments 22 can be operated as background segments 22''' with a maximum value 28 of the transparency. Depending on the technology, this can be a completely clear segment or a segment having a light transmissivity of for example 50 percent or more than 50 percent.

If the selection of the currently selected object 23' changes, it is possible, as shown in FIG. 2, for the displayed objects 23 to be displaced in the display content 15 in the manner of a merry-go-round by actuation of the pixel matrix 16 such that, with the position of the selection segment 22' and the intermediate segments 22" unchanged, the currently selected object 23' is positioned or arranged in front of or over the selection segment 22'. As a result, the viewing direction for the user does not change when they wish to view the currently selected object 23'.

Figure 3:
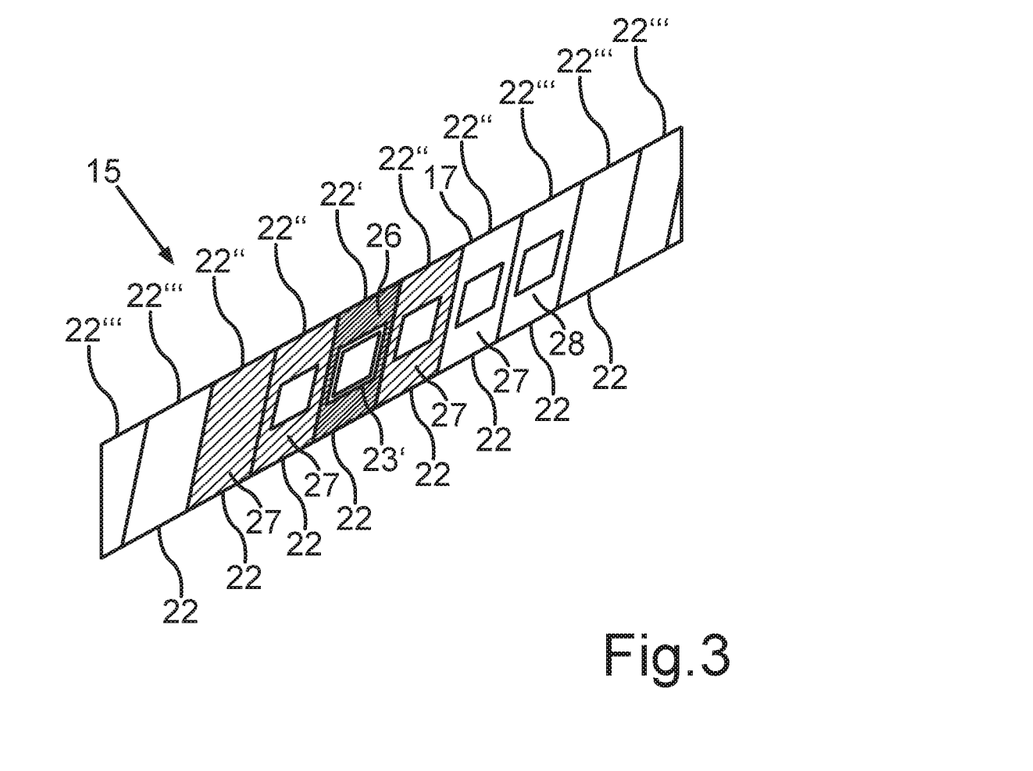
FIG. 3 is a schematic illustration of a display content of the display apparatus during the change of the selection of an object, wherein the object is presented in a spatially fixed manner.

FIG. 3 shows an alternative possibility in which the currently selected object 23' is kept in a spatially fixed manner on the pixel matrix 16 and the segment arranged behind the selected object 23 is set or operated as a selection segment 22'. In accordance with this, it is then possible for each neighboring segment to be operated as an intermediate segment 22" with the intermediate value 27 for the transparency.

The number of the settable intermediate values in the segments 22 is for example greater than 1, for example greater than 2. The segments 22 are for example switchable without a step between opaque and transparent, which can be realized with the technologies. The idea is thus to make the menu selection for selecting a graphic object 23 from a plurality of graphic objects possible by use of the switchable screening layer. The graphic objects can be positioned in this way for example as a menu on a graphical user interface (GUI), wherein the individual illustrated graphic objects 23 correspond to in each case one segment 22. When an object 23 is selected for example as a menu element, the segment 22 located therebehind is switched to the minimum value of the transparency or the maximum value of the opacity (100 percent opaque). The objects arranged adjacently within a predetermined close range can be switched to a first intermediate value of the transparency or opacity (for example 80 percent opacity). The adjoining segments arranged further away from the selected object can be switched to a greater degree of transparency/a lower value of the opacity, for example 60 percent opacity. It is thus possible in a step-wise fashion to create a transition or a fade-effect in a step-wise fashion from 100 percent opacity to 0 percent opacity (maximum value of the transparency).

In the embodiment illustrated in FIG. 2, for the case that the user scrolls with their selection through the menu or the objects, the respectively newly selected object 23' is presented in the 100 percent opaque segment or, as is illustrated in FIG. 3, the 100 percent opaque segment moves to the newly selected object 23'.

The advantage of this display apparatus is that segmented dark films in combination with a projection film (transparent pixel matrix) are provided, in which the menu selection with the currently selected object is made clear by use of a gradient of the transparency in the switchable screening layer. In this way, by setting this minimum transparency behind the selected object, the latter is presented so as to be the most visible owing to the greatest contrast.

In this case, it is furthermore possible to see through the display apparatus, for example the pixel matrix and the screening layer, and see the free space located therebehind. In this way it is possible for example to take note of the environment of the motor vehicle and to have a better sense of space. However, the display can also be arranged for example on a trim surface 12', for example a wood veneer layer. In this case, too, the opacity of the segment behind the selected object and the step-wise transition to transparent segments contributes to a recognizability and visual noticeability of the currently selected object. The selection can be made for example by use of a touch screen or touchpad by switching the selection of objects using a wiping movement.

Figure 4:
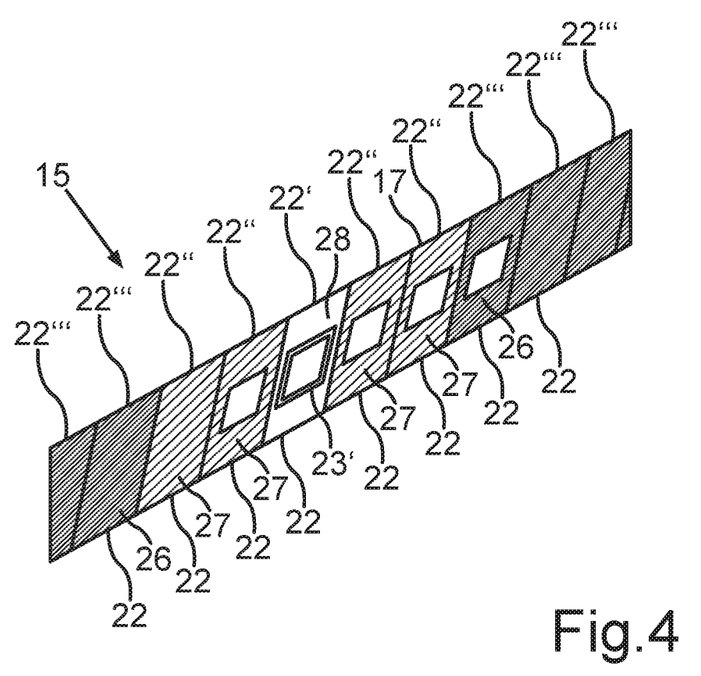
FIG. 4 is a schematic illustration of a display content of the display apparatus in an embodiment in which a background of the selected object is switched to transparent.

FIG. 4 shows a display content of the display apparatus as can occur if a background of the selected object is switched to transparent, that is to say the at least one selection segment 22' is operated with the maximum value 28 of the transparency and the at least one background segment 22''' is operated with the minimum value 26 of the transparency. At least one intermediate segment 22" may be provided.

Figure 5:
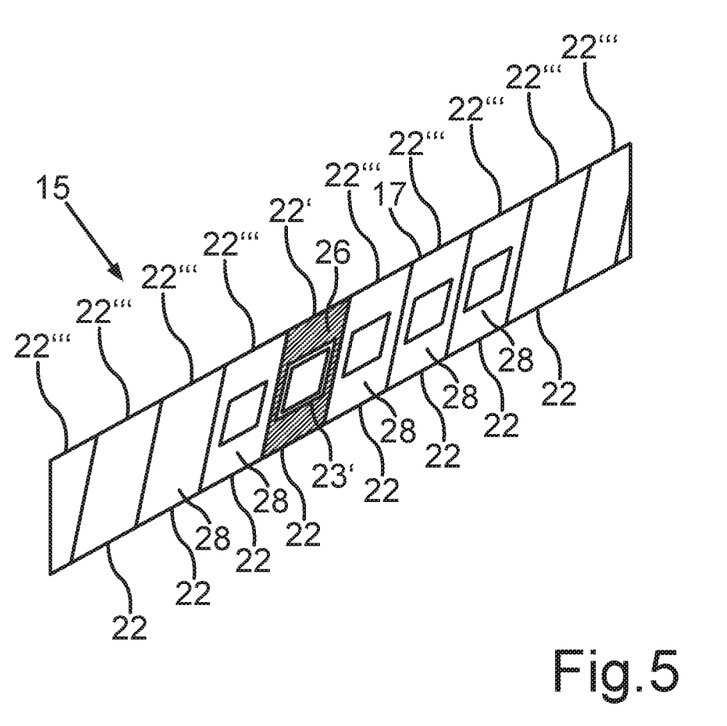

FIG. 5 shows a display content of the display apparatus as can occur if the at least one intermediate segment is dispensed with and only at least one selection segment 22' behind the selected object 23' and at least one background segment 22''' that is switched in complementary fashion with respect to the at least one selection segment 22' is provided. It illustrates an example in which the selection segment 22' is operated with the minimum value 26 of the transparency and background segments 22''' are operated with the maximum value 28 of the transparency.

Overall, the examples show how a selection menu on a transparent display (display apparatus) can be supported by the display apparatus described herein by use of the switchable opacity of a switchable screening layer.

A description has been provided with reference to various examples, but it will be understood that variations and modifications can be effected within the spirit and scope of the claims which may include the phrase "at least one of A, B, and C" as an alternative expression that means one or more of A, B, and C may be used, contrary to the holding in Superguide v. DIRECTV, 358 F3d 870, 69 USPQ2d 1865 (Fed. Cir. 2004). By way of example, the scope of the expression "at least one of A, B, and C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

The invention claimed is:

1. A display apparatus, comprising:
a transparent pixel matrix to display a plurality of graphic objects viewable by a user from a main viewing point along a main viewing direction;
a screening layer with segments that are individually switchable with respect to transparencies of the segments and arranged, viewed along the main viewing direction, behind the pixel matrix to correspond respectively to selected and non-selected displayed graphic objects, from among the displayed plurality of graphic objects; and
a control circuit configured to:
display the plurality of graphic objects on the pixel matrix,
perform a selection of a graphic object, from among the graphic objects, displayed on the pixel matrix based on an input by the user, and
in response to the selection of the graphic object, signal, viewed along the main viewing direction, that the graphic object is currently selected, by:
individually switching transparencies of respective segments, from among the segments, between a minimum value and a maximum value,
the switching of the transparencies including,
operating a first segment as a selection segment, from among the respective segments, which is arranged behind the selected graphic object and corresponds to the selected graphic object, with the minimum value of transparency, and
operating a second segment as a background segment, from among the respective segments, which is arranged behind a non-selected graphic object, from among the displayed plurality of graphic objects, and corresponds to the non-selected graphic object, with the maximum value of transparency.

2. The display apparatus according to claim 1, wherein
at least some or all of the segments are switchable with respect to the transparencies of the segments to an intermediate value which lies between the minimum value and the maximum value, and
the control circuit is configured to signal, viewed along the main viewing direction, that the graphic object is currently selected, by operating a third segment arranged between the selection segment and the background segment as an intermediate segment, with the intermediate value of transparency.

3. The display apparatus according to claim 2, wherein
the control circuit is configured to operate the first segment with the minimum value of transparency, the third segment with the intermediate value of transparency, and the second segment with the maximum value of transparency, such that a transparency of the first, third, and second segments increases in a step-wise manner in at least two steps.

4. The display apparatus according to claim 2, wherein the control circuit is configured to operate a plurality of segments among the segments as intermediate segments with different intermediate values of transparency.

5. The display apparatus according to claim 1, wherein the control circuit is configured to operate each of the segments as the background segment if there is no selected graphic object.

6. The display apparatus according to claim 2, wherein
the control circuit is configured to change the selected graphic object according to an input by the user, and
in response to a selection of a second graphic object among the plurality of graphic objects, the control circuit is configured to display on the pixel matrix the selected second graphic object in a spatially fixed manner and to set the transparency of the segments of the screening layer based on a position of the selected second graphic object.

7. The display apparatus according to claim 2, wherein
the control circuit is configured to change the selected graphic object according to an input by the user, and
in response to a selection of a second graphic object among the plurality of graphic objects, the control circuit is configured to operate the selection segment, the intermediate segment, and the background segment in an unchanged manner and to display on the pixel matrix the selected second graphic object in front of the selection segment.

8. The display apparatus according to claim 1, wherein a respective surface area of the segments corresponds to an overall surface area of an individual pixel or of a plurality of pixels of the pixel matrix.

9. The display apparatus according to claim 8, wherein each of the segments corresponds to a respective graphic object displayable by the pixel matrix.

10. The display apparatus according to claim 1, wherein the segments are monochrome at a respective point in time.

11. A motor vehicle, comprising:
a chassis;
a trim surface; and
a display apparatus, including:
a transparent pixel matrix to display a plurality of graphic objects viewable by a user from a main viewing point along a main viewing direction,
a screening layer with segments that are individually switchable with respect to transparencies of the segments and arranged, viewed along the main viewing direction, behind the pixel matrix to correspond respectively to selected and non-selected displayed graphic objects, from among the displayed plurality of graphic objects, and
a control circuit configured to:
display the plurality of graphic objects on the pixel matrix,
perform a selection of a graphic object, from among the graphic objects, displayed on the pixel matrix based on an input by the user, and
in response to the selection of the graphic object, signal, viewed along the main viewing direction, that the graphic object is currently selected, by:
individually switching transparencies of respective segments, from among the segments, between a minimum value and a maximum value,
the switching of the transparencies including,
operating a first segment as a selection segment, from among the respective segments, which is arranged behind the selected graphic object and corresponds to the selected graphic object, with the minimum value of transparency, and
operating a second segment as a background segment, from among the respective segments, which is arranged behind a non-selected graphic object, from among the displayed plurality of graphic objects, and corresponds to the non-selected graphic object, with the maximum value of transparency,
wherein a free space or the trim surface is disposed behind the display apparatus and is viewable through the display apparatus, along the main viewing direction, according to the switched transparencies of the respective segments.

12. The motor vehicle according to claim 11, wherein
at least some or all of the segments are switchable with respect to the transparencies of the segments to an intermediate value which lies between the minimum value and the maximum value, and
the control circuit is configured to signal, viewed along the main viewing direction, that the graphic object is currently selected, by operating a third segment arranged between the selection segment and the background segment as an intermediate segment, with the intermediate value of transparency.

13. The motor vehicle according to claim 12, wherein
the control circuit is configured to operate the first segment with the minimum value of transparency, the third segment with the intermediate value of transparency, and the second segment with the maximum value of transparency, such that a transparency of the first, third, and second segments increases in a step-wise manner in at least two steps.

14. The motor vehicle according to claim 12, wherein the control circuit is configured to operate a plurality of segments among the segments as intermediate segments with different intermediate values of transparency.

15. The motor vehicle according to claim 11, wherein the control circuit is configured to operate each of the segments as the background segment if there is no selected graphic object.

16. The motor vehicle according to claim 12, wherein
the control circuit is configured to change the selected graphic object according to an input by the user, and
in response to a selection of a second graphic object among the plurality of graphic objects, the control circuit is configured to display on the pixel matrix the selected second graphic object in a spatially fixed manner and to set the transparency of the segments of the screening layer based on a position of the selected second graphic object.

17. The motor vehicle according to claim 12, wherein the control circuit is configured to change the selected graphic object according to an input by the user, and in response to a selection of a second graphic object among the plurality of graphic objects, the control circuit is configured to operate the selection segment, the intermediate segment, and the background segment in an unchanged manner and to display on the pixel matrix the selected second graphic object in front of the selection segment.

18. The motor vehicle according to claim 11, wherein the selection segment has an area greater than an area of pixels of the pixel matrix which display the selected graphic object.

19. The motor vehicle according to claim 12, wherein the first, third, and second segments are arranged in a direction perpendicular to the main viewing direction.

20. A method of operating a display apparatus, comprising:

by a control circuit,
displaying a plurality of graphic objects, on a transparent pixel matrix;
selecting a graphic object, from among the graphic objects displayed on the pixel matrix, based on an input by a user; and
operating a screening layer with segments that are individually switchable with respect to transparencies of the segments and arranged, viewed along a main viewing direction, behind the pixel matrix to correspond respectively to selected and non-selected displayed graphic objects, from among the displayed plurality of graphic objects, in response to the selecting of the graphic object, switching transparencies of respective segments, from among the segments, between a minimum value, a maximum value, and an intermediate value, the switching of the transparencies including, a first segment, from among the segments, which is arranged behind the selected graphic object and corresponds to the selected graphic object, is operated as a selection segment with the minimum value of transparency, a second segment, from among the segments, which is arranged behind a first non-selected graphic object, from among the displayed plurality of graphic objects, and corresponds to the non-selected graphic object, is operated as a background segment with the maximum value of the transparency, and a third segment, from among the segments, which is arranged between the selection segment and the background segment, and arranged behind a second non-selected graphic object, from among the displayed plurality of graphic objects, and corresponds to the non-selected graphic object, is operated as an intermediate segment with the intermediate value of the transparency.

* * * * *

UNITED STATES PATENT AND TRADEMARK OFFICE
CERTIFICATE OF CORRECTION

| | | |
|---|---|---|
| PATENT NO. | : 11,623,524 B2 | Page 1 of 1 |
| APPLICATION NO. | : 17/605855 | |
| DATED | : April 11, 2023 | |
| INVENTOR(S) | : Jacques Helot et al. | |

It is certified that error appears in the above-identified patent and that said Letters Patent is hereby corrected as shown below:

On the Title Page

Item (87), PCT Publication Date, delete "Mar. 6, 2021" and insert --May 6, 2021--.

Signed and Sealed this
Sixth Day of June, 2023

Katherine Kelly Vidal
*Director of the United States Patent and Trademark Office*